United States Patent
Krappmann et al.

(10) Patent No.: US 6,712,362 B2
(45) Date of Patent: Mar. 30, 2004

(54) PRIMARY SEALS FOR MASTER-SLAVE CYLINDER SYSTEMS

(75) Inventors: Klaus Krappmann, Gochsheim (DE); André Gemeinhardt, Obereuerheim (DE); Hai Sui, Schonungen (DE); Dieter Gebauer, Geldersheim (DE); Boleslaw Tulaczko, Schonungen (DE); Volker Stampf, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/973,605

(22) Filed: Oct. 9, 2001

(65) Prior Publication Data

US 2002/0050686 A1 May 2, 2002

(30) Foreign Application Priority Data

Oct. 28, 2000 (DE) .......................... 100 53 571

(51) Int. Cl.[7] .................. F16J 9/00; B60T 11/236
(52) U.S. Cl. ............... 277/437; 277/455; 277/460; 277/560; 277/572; 277/584; 188/322.17; 188/322.18
(58) Field of Search ................ 277/436, 452, 277/455, 459, 460, 531, 572, 584, 437; 188/322.17, 322.18

(56) References Cited

U.S. PATENT DOCUMENTS

| | | | | |
|---|---|---|---|---|
| 2,019,523 A | * | 11/1935 | Davies | 277/531 |
| 2,531,705 A | * | 11/1950 | Schultz | 60/585 |
| 2,998,987 A | * | 9/1961 | Taschenberg et al. | 277/553 |
| 3,056,608 A | * | 10/1962 | Flynn | 277/558 |
| 3,394,939 A | * | 7/1968 | Mastro | 277/309 |
| 3,477,731 A | * | 11/1969 | Workman | 277/558 |
| 3,712,684 A | * | 1/1973 | Cordiano | 303/22.5 |
| 3,765,690 A | * | 10/1973 | Sievenpiper | 277/556 |
| 3,829,104 A | * | 8/1974 | Green | 277/552 |
| 4,053,166 A | * | 10/1977 | Domkowski | 277/588 |
| 4,143,586 A | * | 3/1979 | Zitting | 92/206 |
| 4,231,578 A | * | 11/1980 | Traub | 277/572 |
| 4,262,915 A | * | 4/1981 | Williams | 277/560 |
| 4,421,330 A | * | 12/1983 | Burke | 277/584 |
| 4,566,702 A | * | 1/1986 | Traub | 277/589 |
| 4,570,944 A | * | 2/1986 | Traub | 277/572 |
| 4,585,109 A | * | 4/1986 | Shirley et al. | 192/85 CA |
| 4,599,860 A | * | 7/1986 | Parsons | 60/584 |
| 4,893,823 A | * | 1/1990 | Strouse et al. | 277/437 |
| 5,092,125 A | * | 3/1992 | Leight-Monstevens et al. | 60/589 |
| 5,251,446 A | * | 10/1993 | Mori et al. | 60/533 |
| 6,173,961 B1 | * | 1/2001 | Martin | 277/353 |
| 6,273,231 B1 | * | 8/2001 | Koschmieder et al. | 192/85 CA |
| 6,336,329 B1 | * | 1/2002 | Adler et al. | 60/588 |

FOREIGN PATENT DOCUMENTS

| | | | |
|---|---|---|---|
| DE | 37 38 512 | 5/1997 | |
| DE | 196 53 947 A1 | * 6/1998 | |
| DE | 198 47 529 A1 | * 9/1999 | |
| DE | 198 50 560 | 5/2000 | F15B/7/08 |

* cited by examiner

Primary Examiner—Alison K. Pickard
(74) Attorney, Agent, or Firm—Cohen, Pontani, Lieberman & Pavane

(57) ABSTRACT

In a master/slave cylinder system for clutches or brakes, primary seals have bevels which interact with similar bevels of formations on housings of the respective cylinders. Along with the lowest possible friction in the region of the sealing lips, this permits carrying out uncomplicated pressure/negative-pressure filling in the case of the master cylinder. The primary seals slide by the wedge of effects in the direction of the pressure on the bevels of the annular formations and reduce the annular bearing face of the sealing lip in a frictionally optimized manner.

14 Claims, 2 Drawing Sheets

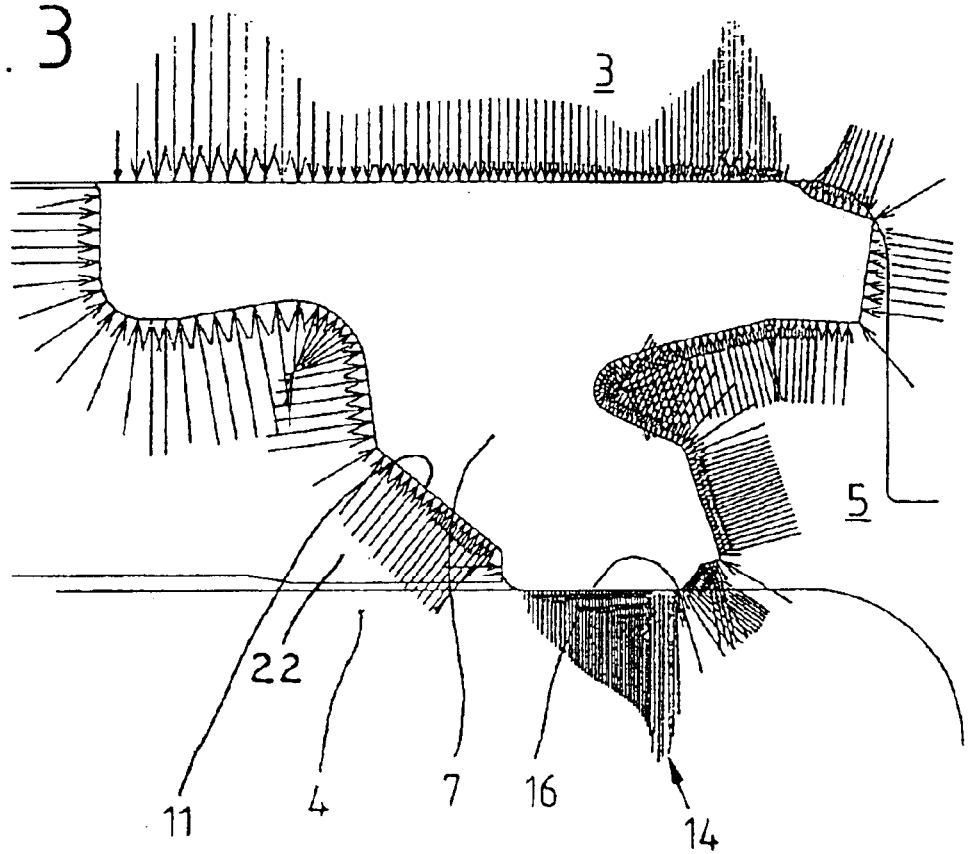

PRIMARY SEALS FOR MASTER-SLAVE CYLINDER SYSTEMS

BACKGROUND OF THE INVENTION

1. Field of the Invention

The invention relates to a hydraulic installation for the actuation of a brake or a clutch of a motor vehicle, including a master cylinder with a housing and with a housing and a piston, a hydraulic line connecting the housings, and a variable pressure chamber in the hydraulic line, which pressure chamber is sealed with respect to each piston by at east one seal facing the pressure chamber.

2. Description of the Related Art

German Patent DE 37 38 512 C2 discloses a seal, preferably for hydraulic installations, with which the friction can be kept low even at high pressures. Provided for this purpose is a conical supporting ring of rigid material, which is slightly smaller in diameter than the housing bore and has an angle αwhich is between 45 and 80°, the angle β of the sealing ring bearing the sealing lip in the attached state being smaller by about 1–10° than a and the width of the sealing ring protruding axially from the supporting ring being less than about 40° of the entire seal. The object of the invention is to provide a seal which, with compact dimensions, has a lower friction even at high pressures. Under relatively high pressures, the L-shaped sealing ring is turned into the form predetermined by the supporting ring, the force acting on the housing bore at the edge of the sealing lip being kept within predetermined limits. Transfer of the main part of the normal force via the supporting ring to the housing bore is ruled out, because the supporting ring is kept at a distance from the housing bore and is rigid. As a result, the sealing ring does not deform excessively, with the result that slender L-shaped sealing rings that require only a relatively small installation space can be used.

SUMMARY OF THE INVENTION

By comparison with this, the present invention proposes primary seals which have toward the piston a bevel which interacts with a parallel bevel of a formation on a rigid component, the primary seals being fixed in their position and able to move plastically only by the influence of high pressures in the pressure chamber filled with hydraulic fluid. Annular formations are proposed both for the master cylinder and for the slave cylinder, the first primary seal of the master cylinder being accomplished by the fitting of a spacing ring and the second primary seal of the slave cylinder being accomplished by the fitting of a guide sleeve. It is ensured that, even without pressure being applied, the primary seals in the installed state produce a sealing action, which has an effect in particular on the side of the primary seals facing away from the pressure chamber.

The crux of the invention is the interaction between a sealing lip which can slide on a displaceable piston with the aforementioned bevels, which produce a wedge effect, in particular when pressure is applied, by which effect the primary seal is pressed into its seat facing away from the pressure chamber, whereby the sealing lips move slightly toward the formations and reduce the spacing and consequently their frictional resistances. The region of the primary seal in which the sealing lip is arranged is the only movable region and pivots against the piston, the greatest pressing forces building up in the region of the sealing lip. In the direction of the bevel, these forces quickly approach zero and no longer cause any frictional resistances that oppose the actuation force and increase the friction.

For the first filling at the premises of the customer fitting the installation, it proves to be advantageous to make the first bevel provide a sealing effect with the second bevel with a certain pressing force, which, in particular in the case of pressure/negative-pressure filling, prevents hydraulic fluid from flowing behind the primary seal to the side facing away from the pressure chamber. Finally, the sealing lip bearing against the piston in the master cylinder only in a narrow annular region promotes the return of hydraulic fluid, which makes the function of the hydraulic installation dependable even when actuated repeatedly.

It is consequently the object of the invention to provide a primary seal for hydraulic installations, in particular for master and slave cylinders, which has advantages with regard to friction, filling and the return of hydraulic fluid when actuated repeatedly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a second primary seal according to FIG. 2 with a diagram of forces.

DETAILED DESCRIPTION OF THE PRESENTLY PREFERRED EMBODIMENTS

Figure 1:
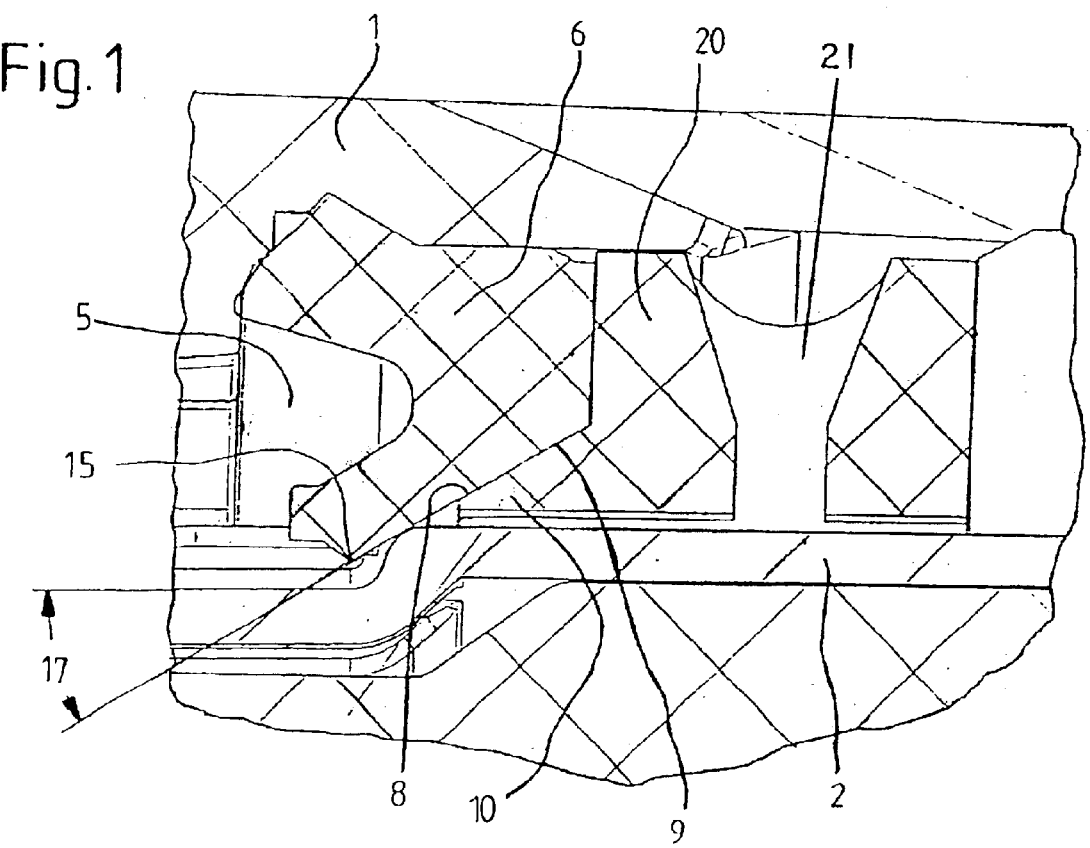
FIG. 1 shows in part section a housing with a piston of a master cylinder and a first primary seal acting between the latter.

FIG. 1 shows a housing 1 of a master cylinder, in which a piston 2 is arranged displaceably for delimiting a pressure chamber 5. The piston 2 can be displaced in a guide of the housing 1 and is represented in a dead-center position with the largest possible pressure chamber 5. The pressure chamber 5 is sealed off from the atmosphere by a first primary seal 6, the latter being firmly anchored in the housing 1 by a spacing ring 20 and having a first sealing lip 15, which is directed toward the piston 2 and seals the pressure chamber 5, in case the piston 2 is displaced out of the dead-center position described above. The first primary seal 6 has a first bevel 8, which bears with surface contact against a second bevel 9 of a first annular formation 10 and largely seals the contact surface with the spacing ring 20. The bevels 8 and 9 have in relation to the direction of movement of the piston 2 an angle 17 of 20 to 40 degrees. This angle plays a decisive part for the pressing force of the sealing lip when the piston 2 is displaced out of its dead-center position, it being necessary when there are relatively high pressures in the pressure chamber 5 to find an optimum between the resting of the sealing lip 15 on the outside diameter of the piston 2 and sufficiently high pressing forces of the sealing lip 15 on the described annular face of the piston 2. It has been found that an angle 17 of 32° satisfies the aforementioned requirements best. For pressure/negative-pressure filling, the proposed design with the first annular formation 10 radially spaced from the piston proves to be advantageous, since the liquid passes from an external vessel via the channel 21 of the spacing ring 20 past the sealing lip 15 to the pressure chamber 5, without flowing by the resting of the first primary seal 6 on the spacing ring 20, thanks to the bevels 8 and 9.

The advantages of the first primary seal 6 with its first sealing lip 15 are that the sealing lip 15 is arranged in the region of a relatively weakly formed annular portion, which develops high elasticity in the radial direction. It is also this that promotes a return of hydraulic fluid when the piston 2 is actuated repeatedly and keeps the maximum pressures in the annular space 5 approximately constant.

Figure 2:
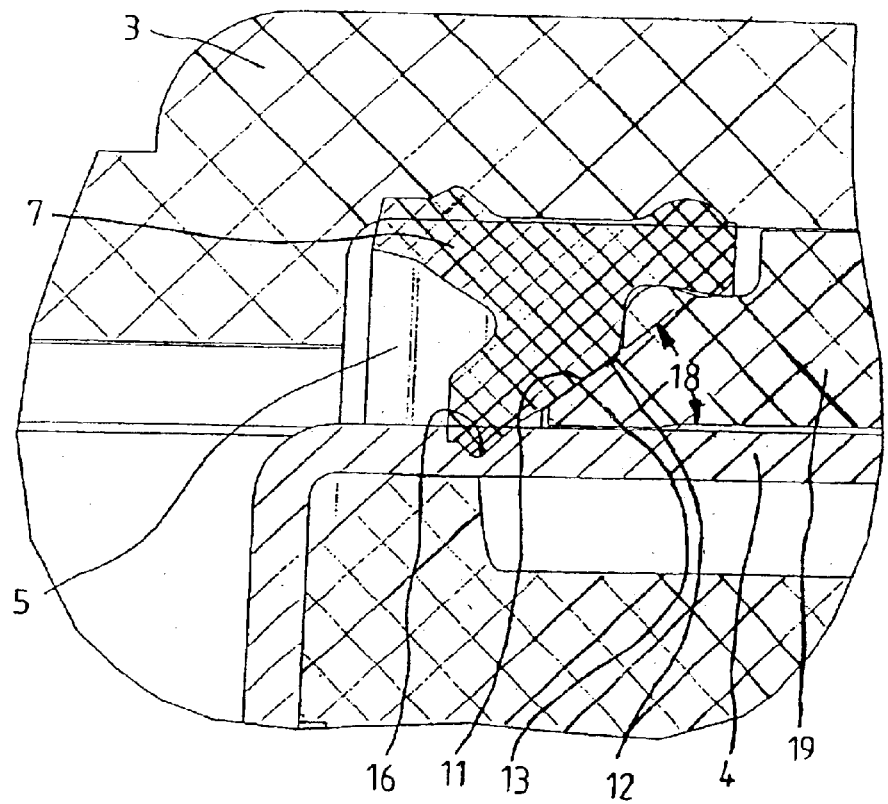
FIG. 2 shows in part section a housing and a piston of a slave cylinder with a second primary seal acting between the latter.

According to FIG. 2, between a housing 3 of a slave cylinder and a piston 4 which can be displaced therein is a second primary seal 7, which is fixed in the housing 3 by means of a guide sleeve 19, the guide sleeve 19 having a second bevel 12, which interacts with a first bevel 11 on the second primary seal 7. The second bevel 12 belongs to a second annular formation 13, which is connected to the guide sleeve 19. The slave cylinder is connected to the master cylinder via a hydraulic line, with the result that the second primary seal 7 must seal off the pressure chamber 5 in the slave cylinder from the atmosphere. To reduce friction at the second sealing lip 16, again an angle 18 is arranged, followed by the first bevel 11 of the second primary seal 7 and the second bevel 12 of the second annular formation 13. This angle 18 is also optimized, with regard to its pressing force of a second sealing lip 16 and the friction of the latter produced on the outer face of the piston 4, at 30 to 40 degrees, preferably 35 degrees, it being possible to bring about slight changes from this value when there is a change in the influencing factors, such as diameter ratios or the like.

According to FIG. 3, the variation in forces around the second primary seal 7 is represented in a diagram. A build-up of forces on the peripheral face lying opposite the pressure chamber 5, which is a consequence of the uniform pressure of the pressure chamber 5, can be seen there, the face showing in particular in the region of the second sealing lip 16 pressing forces 14 which drop sharply in the direction of the first bevel 11 and only there develop pressing forces 14 corresponding to the pressure build-up in the pressure chamber 5. Note that the annular formation 12 remains radially spaced from the piston 4 when pressure is built up.

The advantage of the proposed invention, along with the lowest possible friction in the region of the sealing lips 15 and 16, lies in the possibility of carrying out uncomplicated pressure/negative-pressure filling in the case of the master cylinder, and in the property of the primary seals 6, 7 to slide by the wedge effects in the direction of the pressure on the bevels 9 and 12 of the annular formations 10 and 13 and to reduce the annular bearing face of the sealing lips 15 and 16 in a frictionally optimized manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydraulic system for the actuation of one of a brake and a clutch in a motor vehicle, said system comprising a master cylinder, a slave cylinder, and a variable pressure chamber therebetween, each of said cylinders comprising a housing, a piston which can be displaced in said housing along an axis, a primary seal seated in said housing facing said pressure chamber and axially fixed with respect to said housing, said primary seal having a sealing lip which contacts said piston and a first bevel facing oppositely from said pressure chamber, said first bevel being formed at an angle to said axis, and a rigid component comprising an annular formation supporting said primary seal, said annular formation being radially spaced from said piston and having a second bevel borne against by said first bevel, whereby during build-up of pressure in the pressure chamber, said second bevel supports said first bevel in order to concentrate friction forces at the sealing lip during displacement of the piston, wherein the first bevel of the primary seal of the master cylinder and the second bevel of the annular formation of the master cylinder form a common angle of 20 to 40 degrees with said axis.

2. A hydraulic system as in claim 1 wherein the first bevel of the primary seal of the master cylinder and the second bevel of the annular formation of the master cylinder are formed at an angle of 32 degrees to the axis.

3. A hydraulic system as in claim 1 wherein first bevel of the primary seal of the slave cylinder and the second bevel of the annular seal of the slave cylinder form a common angle of 30 to 40 degrees with said axis.

4. A hydraulic system as in claim 3 wherein the first bevel of the primary seal of the slave cylinder and the second bevel of the annular formation of the slave cylinder are formed at an angle of 35 degrees to the axis.

5. A hydraulic system as in claim 1 further comprising a spacing ring arranged between said piston and said housing of said master cylinder, said annular formation being located on said spacing ring.

6. A hydraulic system as in claim 1 further comprising a guide sleeve arranged between said piston and said housing of said slave cylinder, said annular formation being located on said guide sleeve.

7. A hydraulic system as in claim 1 wherein said angles of said bevels are optimized experimentally so that said first bevel slides on said second bevel in the direction of pressure.

8. A hydraulic system as in claim 1 wherein the first bevel of the primary seal of the master cylinder and the second bevel of the annular formation of the master cylinder form a seal with low prestress.

9. A hydraulic system as in claim 1 wherein pressing forces are concentrated on said sealing lip of said master cylinder, whereby return of hydraulic fluid in the master cylinder is promoted.

10. A hydraulic system for the actuation of one of a brake and a clutch in a motor vehicle, said system comprising at least one of a master cylinder and a slave cylinder, and a variable pressure chamber communicating with each said at least one cylinder, each of said cylinders comprising a housing, a piston which can be displaced in said housing along an axis, a primary seal seated in said housing facing said pressure chamber and axially fixed with respect to said housing, said primary seal having a sealing lip which contacts said piston and a first bevel facing oppositely from said pressure chamber, said first bevel being formed at an angle to said axis, and a rigid component comprising an annular formation supporting said primary seal, said annular formation being radially spaced from said piston and having a second bevel borne against by said first bevel, whereby during build-up of pressure in the pressure chamber, said second bevel supports said first bevel in order to concentrate friction forces at the sealing lip during displacement of the piston, wherein the first bevel of the primary seal is formed at an angle of 20 to 40 degrees to the axis.

11. A hydraulic system as in claim 10 wherein the first bevel of the primary seal and the second bevel of the annular formation form a common angle with said axis.

12. A hydraulic system for the actuation of one of a brake and a clutch in a motor vehicle, said system comprising a master cylinder, a slave cylinder, and a variable pressure chamber therebetween, each of said cylinders comprising a housing, a piston which can be displaced in said housing along an axis, a primary seal seated in said housing facing said pressure chamber and axially fixed with respect to said housing, said primary seal having a sealing lip which contacts said piston and a first bevel facing oppositely from said pressure chamber, said first bevel being formed at an angle to said axis, and a rigid component comprising an annular formation supporting said primary seal, said annular formation being radially spaced from said piston and having a second bevel borne against by said first bevel, whereby during build-up of pressure in the pressure chamber, said second bevel supports said first bevel in order to concentrate friction forces at the sealing lip during displacement of the piston, wherein said first bevel of the primary seal of the slave cylinder and the second bevel of the annular seal of the slave cylinder form a common angle of 30 to 40 degrees with said axis.

13. A hydraulic system as in claim 12 wherein the first bevel of the primary seal of the slave cylinder and the second bevel of the annular formation of the slave cylinder are formed at an angle of 35 degrees to the axis.

14. A hydraulic system as in claim 12 further comprising a guide sleeve arranged between said piston and said housing of said slave cylinder, said annular formation being located on said guide sleeve.

* * * * *